(12) United States Patent
Rollins

(10) Patent No.: US 7,526,795 B2
(45) Date of Patent: Apr. 28, 2009

(54) DATA SECURITY FOR DIGITAL DATA STORAGE

(75) Inventor: Doug L. Rollins, Nampa, ID (US)

(73) Assignee: Micron Technology, Inc., Boise, ID (US)

( * ) Notice: Subject to any disclaimer, the term of this patent is extended or adjusted under 35 U.S.C. 154(b) by 793 days.

(21) Appl. No.: 09/818,699

(22) Filed: Mar. 27, 2001

(65) Prior Publication Data

US 2002/0141588 A1 Oct. 3, 2002

(51) Int. Cl.
*G06F 17/30* (2006.01)
(52) U.S. Cl. ............................... 726/3; 726/2; 380/282; 713/165; 713/168
(58) Field of Classification Search ................ 380/277, 380/282; 713/168, 165; 705/71; 726/2–3
See application file for complete search history.

(56) References Cited

U.S. PATENT DOCUMENTS

| | | | |
|---|---|---|---|
| 4,150,404 A | 4/1979 | Tercic et al. | |
| 4,262,329 A | 4/1981 | Bright et al. | |
| 4,493,028 A | 1/1985 | Heath | |
| 4,799,258 A | 1/1989 | Davies | |
| 4,864,616 A * | 9/1989 | Pond et al. | 713/165 |
| 4,873,645 A | 10/1989 | Hunter et al. | |
| 4,903,296 A | 2/1990 | Chandra et al. | |
| 5,007,082 A | 4/1991 | Cummins | |
| 5,052,040 A | 9/1991 | Preston et al. | |
| 5,068,894 A | 11/1991 | Hoppe | |
| 5,142,578 A | 8/1992 | Matyas et al. | |
| 5,212,729 A | 5/1993 | Schafer | |
| 5,231,662 A | 7/1993 | Van Rumpt et al. | |
| 5,235,641 A | 8/1993 | Nozawa et al. | |
| 5,265,159 A | 11/1993 | Kung | |
| 5,317,638 A | 5/1994 | Kao et al. | |
| 5,325,430 A | 6/1994 | Smyth et al. | |
| 5,343,525 A | 8/1994 | Hung et al. | |
| 5,375,243 A | 12/1994 | Parzych et al. | |
| 5,379,344 A | 1/1995 | Larsson et al. | |
| 5,394,469 A | 2/1995 | Nagel et al. | |
| 5,402,492 A | 3/1995 | Goodman et al. | |
| 5,442,706 A | 8/1995 | Kung | |
| 5,513,262 A | 4/1996 | Van Rumpt et al. | |
| 5,563,950 A | 10/1996 | Easter et al. | |
| 5,584,023 A | 12/1996 | Hsu | |

(Continued)

OTHER PUBLICATIONS

B. Schneier, Applied Cryptography, 1996, John Wiley and Sons, Inc., Second edition, pp. 4-5.*

(Continued)

*Primary Examiner*—Minh Dieu Nguyen
(74) *Attorney, Agent, or Firm*—Knobbe, Martens, Olson & Bear, LLP

(57) ABSTRACT

A computing system includes data encryption in the data path between a data source and data storage devices. The data storage devices may be local or they may be network resident. The data encryption may utilize a key which is derived at least in part from an identification code stored in a non-volatile memory. The key may also be derived at least in part from user input to the computer. In a LAN embodiment, public encryption keys may be automatically transferred to a network server for file encryption prior to file transfer to a client system.

10 Claims, 5 Drawing Sheets

U.S. PATENT DOCUMENTS

| | | | |
|---|---|---|---|
| 5,592,549 | A | 1/1997 | Nagel et al. |
| 5,606,610 | A | 2/1997 | Johansson |
| 5,615,262 | A | 3/1997 | Guy et al. |
| 5,623,546 | A | 4/1997 | Hardy et al. |
| 5,631,960 | A | 5/1997 | Likens et al. |
| 5,646,993 | A | 7/1997 | Aizawa |
| 5,680,453 | A | 10/1997 | Akiyama et al. |
| 5,682,549 | A | 10/1997 | Tanaka et al. |
| 5,734,819 | A | 3/1998 | Lewis |
| 5,745,568 | A | 4/1998 | O'Conner et al. |
| 5,796,828 | A | 8/1998 | Tsukamoto et al. |
| 5,796,840 | A | 8/1998 | Davis |
| 5,818,939 | A | 10/1998 | Davis |
| 5,857,021 | A | 1/1999 | Kataoka et al. |
| 5,857,024 | A | 1/1999 | Nishino et al. |
| 5,978,815 | A * | 11/1999 | Cabrera et al. ............. 707/204 |
| 6,032,257 | A | 2/2000 | Olarig et al. |
| 6,081,835 | A * | 6/2000 | Antcliff et al. ............. 709/217 |
| 6,094,721 | A * | 7/2000 | Eldridge et al. ............ 713/168 |
| 6,185,546 | B1 | 2/2001 | Davis |
| 6,185,681 | B1 * | 2/2001 | Zizzi ......................... 713/165 |
| 6,199,163 | B1 | 3/2001 | Dumas et al. |
| 6,216,230 | B1 | 4/2001 | Rallis et al. |
| 6,249,866 | B1 * | 6/2001 | Brundrett et al. ........... 713/165 |
| 6,286,008 | B1 | 9/2001 | Matsumoto et al. |
| 6,310,692 | B1 * | 10/2001 | Fan et al. ................... 358/1.14 |
| 6,327,608 | B1 * | 12/2001 | Dillingham ................ 709/203 |
| 6,343,282 | B1 | 1/2002 | Oshima |
| 6,606,690 | B2 * | 8/2003 | Padovano ................... 711/148 |
| 6,615,349 | B1 * | 9/2003 | Hair ........................... 713/165 |
| 6,668,323 | B1 | 12/2003 | Challener et al. |
| 6,678,821 | B1 | 1/2004 | Waugh et al. |
| 6,701,324 | B1 * | 3/2004 | Cochran et al. ......... 707/104.1 |
| 6,785,812 | B1 * | 8/2004 | Botham et al. ............. 713/168 |
| 6,789,195 | B1 * | 9/2004 | Prihoda et al. ............. 713/182 |
| 6,857,076 | B1 | 2/2005 | Klein |
| 6,862,103 | B1 * | 3/2005 | Miura et al. ............... 358/1.15 |
| 6,876,835 | B1 * | 4/2005 | Marko et al. ............... 455/3.06 |
| 6,947,556 | B1 | 9/2005 | Matyas et al. |
| 7,010,689 | B1 | 3/2006 | Matyas et al. |
| 7,024,474 | B2 * | 4/2006 | Clubb et al. ................ 709/223 |
| 7,096,370 | B1 | 8/2006 | Klein |
| 7,178,021 | B1 * | 2/2007 | Hanna et al. ............... 713/155 |
| 2001/0001876 | A1 * | 5/2001 | Morgan et al. ............. 713/171 |
| 2001/0039659 | A1 * | 11/2001 | Simmons et al. ............. 725/61 |
| 2001/0054099 | A1 * | 12/2001 | Campbell et al. .......... 709/224 |
| 2003/0046366 | A1 * | 3/2003 | Pardikar et al. ............ 709/219 |
| 2004/0044696 | A1 * | 3/2004 | Frost .......................... 707/200 |

OTHER PUBLICATIONS

Casey D. Doyle, Ed., "The Comprehensive Standard for Business, School, Library, and Home," *Microsoft Press*, 2nd Ed., (1994) pp. 249, 271.342, 355.
Microsoft Computer Dictionary, Third edition, 1997, Microsoft Press, pp. 332, 413.
Schneier, Applied Cryptography, 1996. John Wiley and Sons, Inc., Second edition, pp. 4-5.
Microsoft Press-Computer Dictionary Second Edition, 1994, pp. 249, 271, 355.
Microsoft Press-Computer Dictionary Second Edition, 1994, pp. 271, 342.
Notice of Allowance dated Jul. 29, 2004, U.S. Appl. No. 09/277,482.
Response to Office Action, filed Apr. 29, 2004, U.S. Appl. No. 09/277,482.
Non-Final Office Action, dated Jan. 30, 2004, U.S. Appl. No. 09/277,482.
Advisory Action, dated Dec. 18, 2003, U.S. Appl. No. 09/277,482.
Response to Final Action, filed Nov. 21, 2003, U.S. Appl. No. 09/277,482.
Final Office Action, dated Sep. 24, 2003, U.S. Appl. No. 09/277,482.
Response to Office Action, dated Jun. 30, 2003, U.S. Appl. No. 09/277,482.
Non-Final Office Action, dated Apr. 10, 2003, U.S. Appl. No. 09/277,482.
Response to Rule 312 Communication, dated Jul. 3, 2006, U.S. Appl. No. 09/277,335.
Examiner Communication, dated Jun. 5, 2006, U.S. Appl. No. 09/277,335.
Notice of Allowance, dated Mar. 20, 2006, U.S. Appl. No. 09/277,335.
Response to Office Action, filed Dec. 21, 2005, U.S. Appl. No. 09/277,335.
Interview Summary, dated Dec. 15, 2005, U.S. Appl. No. 09/277,335.
Final Office Action, dated Sep. 28, 2005, U.S. Appl. No. 09/277,335.
Supplemental Amendment, filed Sep. 20, 2005, U.S. Appl. No. 09/277,335.
Interview Summary, dated Sep. 20, 2005, U.S. Appl. No. 09/277,335.
Interview Summary, dated Sep. 15, 2005, U.S. Appl. No. 09/277,335.
Interview Summary, dated Jul. 21, 2005, U.S. Appl. No. 09/277,335.
Response to Office Action, filed Jul. 19, 2005, U.S. Appl. No. 09/277,335.
Non-Final Office Action, dated Apr. 20, 2005, U.S. Appl. No. 09/277,335.
Response to Office Action, filed Mar. 30, 2005, U.S. Appl. No. 09/277,335.
Final Office Action, dated Jan. 31, 2005, U.S. Appl. No. 09/277,335.
Response to Office Action, filed Jun. 28, 2004, U.S. Appl. No. 09/277,335.
Non-Final Office Action, dated Mar. 2, 2004, U.S. Appl. No. 09/277,335.
Advisory Action, dated Jan. 13, 2004, U.S. Appl. No. 09/277,335.
Response to Office Action, filed Dec. 17, 2003, U.S. Appl. No. 09/277,335.
Final Office Action, dated Oct. 22, 2003, U.S. Appl. No. 09/277,335.
Response to Office Action, filed Aug. 5, 2003, U.S. Appl. No. 09/277,335.
Non-Final Office Action, dated May 9, 2003, U.S. Appl. No. 09/277,335.
Interview Summary, Interview date Mar. 17, 2003, U.S. Appl. No. 09/277,335.
Response to Office Action, filed Apr. 4, 2003, U.S. Appl. No. 09/277,335.
Response to Office Action, filed Jan. 24, 2003, U.S. Appl. No. 09/277,335.
Final Office Action, dated Nov. 4, 2002, U.S. Appl. No. 09/277,335.
Supplemental Amendment, filed Oct. 8, 2002, U.S. Appl. No. 09/277,335.
Response to Office Action, filed Sep. 6, 2002, U.S. Appl. No. 09/277,335.
Non-Final Office Action, dated May 8, 2002, U.S. Appl. No. 09/277,335.
Notice of Allowance, dated Jun. 14, 2006, U.S. Appl. No. 10/962,997.
Response to Office Action, filed May 22, 2006, U.S. Appl. No. 10/962,997.
Non-Final Office Action, dated Feb. 22, 2006, U.S. Appl. No. 10/962,997.
Non-Final Office Action, dated Aug. 7, 2007, U.S. Appl. No. 11/521,163.
Non-Final Office Action, dated Aug. 7, 2007, U.S. Appl. No. 11/452,594.
Preliminary Amendment, filed Sep. 8, 2006, U.S. Appl. No. 11/452,594.
Konheim, Allen G., "Cryptography, A Primer", 1981, John Wiley and Sons, New York, pp. 348-363.

* cited by examiner

DATA SECURITY FOR DIGITAL DATA STORAGE

BACKGROUND

1. Field

The invention relates to methods and apparatus for providing security for digital data stored on personal computers and network servers on data storage media such as magnetic and optical disks and tapes.

2. Description of the Related Art

Over the past several years, personal computing systems have become more powerful, smaller, and less expensive. As this has occurred, more and more computing applications are performed on personal computer platforms. Local and wide area networks of personal computers are now often used in corporate and business applications instead of the large mainframes used for the same applications in the past. A further result of the increases in performance and decreases in price of personal computers is a dramatic increase in personal computer use for household financial and other sensitive and preferably confidential information.

The use of personal computers in these applications raises data security and privacy issues which have thus far been insufficiently resolved. Laptop and other personal computers, as well as the removable data storage media used in them are transported, mislaid, lost, and sometimes stolen. Consequently, security and privacy issues which were not present when computers and their data storage media were generally fixed have now become prominent. Administrators of computer resources in the business environment must remain aware of the location of portable computing devices as well as the nature of the programs and data stored on them. For home users, concerns arise if credit card, social security, or bank account numbers are present on fixed or removable media which may be lost or stolen. In the network environment, sensitive or confidential data may be stored on resources available to several users.

To resolve a few of these concerns, some programs allow the user to password protect documents or files, thereby preventing access to the data in the file unless the password is known. This provides limited security, however, since these schemes are easy to defeat with widely available password extraction programs. Furthermore, although the act of opening the file may be restricted in the relevant application program, the data itself resides on the media in raw form, and may still be extracted by a trained computer user.

Systems have also been proposed which perform encryption on data and application programs stored on tape and disk. These systems provide improved security over the password protection described above. As one example, a system disclosed in U.S. Pat. No. 5,325,430 to Smyth et al. (incorporated herein by reference in its entirety) includes a security module attached to a personal computer which performs data and application program encryption. The security module communicates with a removable smart card assigned to a given user which contains encryption keys used by the security module. Although the security provided by this system is adequate for many applications, the circuitry used to implement the system is complex, and administration of the system for producing and assigning keys and smart cards is time consuming and expensive.

Another system for encrypting files is disclosed in U.S. Pat. No. 5,235,641 to Nozawa et al., the disclosure of which is also incorporated herein by reference in its entirety. In this system, data stored to a magnetic tape is encrypted by a cryptographic adapter which is located in the data path between a host processor and a tape drive. In this system, the host processor generates cryptographic keys which are stored on the tape itself. This requires additional logic to encrypt the keys as well as the data, and consequently, this system requires relatively complex circuitry, and leaves the key potentially recoverable from the tape itself if the key encryption scheme is broken.

Thus, existing encryption systems for personal and portable computers have serious drawbacks, and have not been widely implemented. In particular, a system which is useful for both an individual personal computer user and users connected through a computer network has not been heretofore provided. Such a system should provide data security with flexibility and without expensive administration or implementation.

SUMMARY

In one embodiment, the invention comprises a method of transferring files over a computer network comprising storing a public encryption key and a private encryption key in a client computer system, sending a request for a data file from the client to a network server, and in response to the request, encrypting the data file with the public encryption key in the server automatically and without user intervention. The encrypted data file is then sent to the client computer system.

The network server may automatically retrieve the public encryption key from the client computer system, and may also check a file attribute to determine that the file is to be encrypted with the public encryption key.

DETAILED DESCRIPTION OF THE INVENTION

Embodiments of the invention will now be described with reference to the accompanying Figures, wherein like numerals refer to like elements throughout. The terminology used in the description presented herein is not intended to be interpreted in any limited or restrictive manner, simply because it is being utilized in conjunction with a detailed description of certain specific embodiments of the invention. Furthermore, embodiments of the invention may include several novel features, no single one of which is solely responsible for its desirable attributes or which is essential to practicing the invention herein described.

Figure 1:
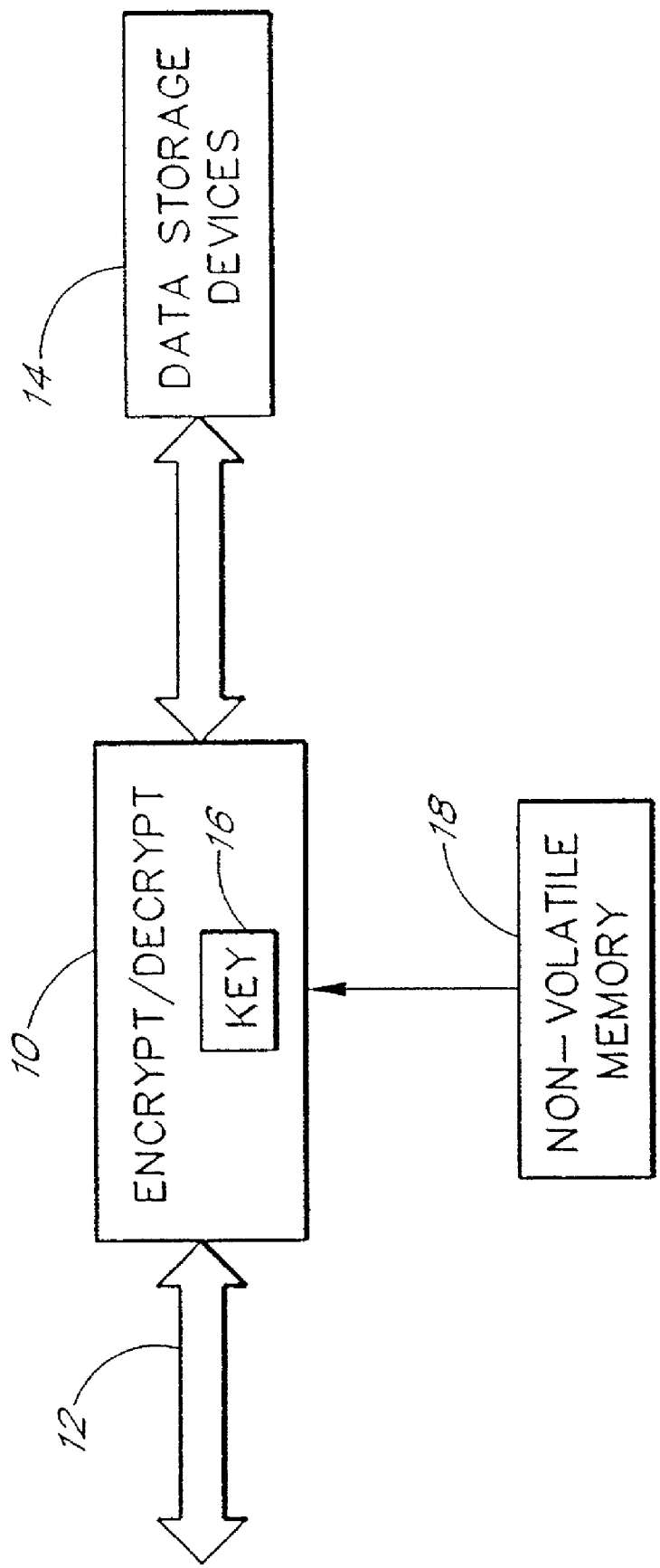
FIG. 1 is a block diagram of a data storage system incorporating an embodiment of the invention.

Referring now to FIG. 1, a data storage system is illustrated which incorporates aspects of the invention. The system includes encryption/decryption logic 10 that is connected to receive digital data from a data bus 12. The encryption/decryption logic 10 is configured to forward data received from the data bus 12 to data storage devices 14 in an encrypted form. The data or information transferred between the data bus 12 and the data storage devices may comprise application programs themselves, data used by application programs, or any other information that the host computing system stores to the data storage devices 14 of the system. As will be further explained below with reference to FIGS. 2 and 3, the encryption/decryption logic may in some embodiments be configurable to perform the encryption and decryption on a selectable subset of the data storage devices if desired by a user of the system.

The algorithm used to perform the encryption may comprise any known encryption algorithm, and many different alternatives will be well known to those of skill in the art. In many applications, the encryption and decryption process will be defined in part by a key 16 which is utilized by the encryption/decryption logic 10 to perform the data manipulation which results in data encryption and decryption. In some systems, the same key is used for both the encryption and decryption processes, but in others, the key 16 may comprise a pair of keys, wherein one is used for encryption, and the other for decryption. Public key cryptographic systems, where an encryption key is publicly available and a decryption key is maintained secret by a user is one example of such a system. Given the variety of encryption and decryption schemes which have been and are currently being developed, the use of the word "key" is intended to encompass any piece of information, data, parameter, definition, configuration of logic circuitry, or other entity or circuit arrangement which serves at least in part to configure the encryption/decryption logic, or to otherwise in any way partly or wholly define the data encryption process which is performed by the encryption/decryption logic 10.

Also provided in the system of FIG. 1 is a non-volatile memory location 18. As is well known in the art, a non-volatile memory has the property that the data or information stored in it remains when the host system is powered down. Non-volatile memory may comprise battery backed up RAM, EPROM, EEPROM, or ROM memory circuitry, for example. In the application of FIG. 1, this memory location 18 may advantageously store an identification code. The stored identification code may be used to derive, at least in part, the key 16 which is used in the encryption process. This derivation may involve simply making the key the identification code itself, or may alternatively involve a logical or mathematical manipulation or transformation of the identification code to produce the key. In some embodiments, as will be further explained below, the key 16 may be derived in part from the identification code stored in the non-volatile memory and in part from a password or other piece of information entered by a user of the computing system.

The system of FIG. 1 includes many advantages over prior art data encryption schemes and is especially applicable to individual personal computer and laptop computer users. In some embodiments, the circuitry of FIG. 1 may be incorporated into, for example, a laptop computer which is sold to an individual for household and/or business use. In most of these situations, the purchased computer will not be a member of a group of computers which is controlled or overseen by a system administrator that will create and assign encryption keys, smart cards, etc. Rather, the laptop will be simply used as is, for both personal and business use by a user who is generally unfamiliar with data security techniques or procedures.

In these embodiments, the identification code may comprise a multi-bit data word which is associated with the individual laptop being used. When stored in a non-erasable memory element such as ROM or EPROM, the identification code may be substantially permanently associated with the individual laptop being used. It will be appreciated that data security in these environments is enhanced if different laptops do not typically share a common identification code. When this is true, the key 16 derived from the identification code will be different in different laptops produced by the laptop manufacturer. It will therefore also be appreciated that the data stored on the data storage devices 14 will be encrypted differently by different laptops. Thus, a removable media such as a floppy disk, tape, or writeable CD will not be useable on any computer except the one that originally stored the data. Thus, a level of security is provided for removable media which may be lost, mislaid, or stolen.

It will also be appreciated that this level of security is provided without any intervention by the user or a system administrator. Key generation and data encryption is automatic and transparent. In addition, this data security scheme is easily implemented in the large scale production of laptops and other personal computers. Machine specific data encryption may be provided with the simple provision of non-volatile storage of information which defines the data encryption process performed. This information may advantageously be substantially uniquely associated with the host computing logic or host computer. This may be ensured by using some form of sequential numbering scheme for the identification code, or alternatively a random or pseudo-random numbering scheme with a low probability of producing two identical identification codes for different laptops. However, it may be noted that it is not necessary to absolutely guarantee that each laptop have a uniquely defined encryption process. The desirable feature is that there be a relatively low probability that lost or stolen media will be readable in some other laptop or personal computer available to someone who has found or has stolen the media elements. Therefore, duplicate identification codes and keys defining identical encryption processes may be provided within a given set of computers while still maintaining a useful level of security. Thus, the association between identification codes and their respective host computers need only be substantially unique such that a reasonable level of security is created.

Figure 2:
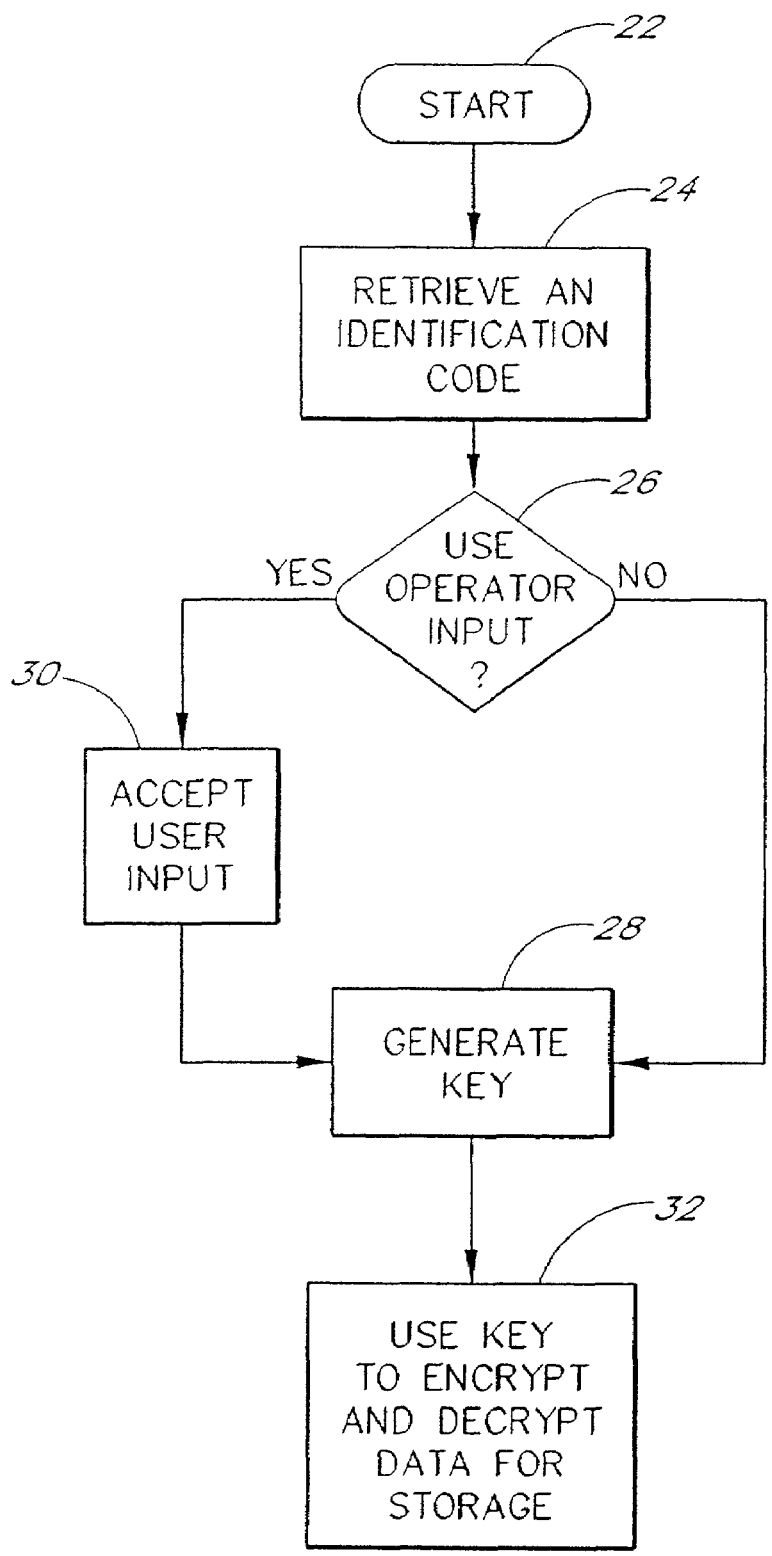
FIG. 2 is a flow chart illustrating acts performed during key generation in an embodiment of the invention.

FIG. 2 illustrates a method of key generation and data encryption according to one embodiment of the invention. It will be appreciated that the method shown in FIG. 2 may, in one embodiment, be implemented on hardware illustrated in FIG. 1.

The method begins at a start state 22, and moves from there to step 24, where an identification code is retrieved. The identification code may be stored in a non-volatile memory, and may in addition be substantially uniquely associated with specific host computer hardware.

The system then moves to decision state 26, where it is decided whether or not some user input should be utilized in the process of encryption key generation. If not, the method moves directly to step 28, where an encryption key is generated using the identification code retrieved at step 24. If user input is to be used in key generation, the method moves from step 26 to step 30, where the user input is accepted by the system. The user input may, for example, comprise an alphanumeric code which is typed into the computer keyboard by the user in response to a system prompt. Following this, the method moves to step 28, where the key is generated using both the identification code and the user input. The user input from step 30 may be an alphanumeric sequence which is converted to a multi-bit word (for example, to ASCII code). This word may be combined with the identification code in many ways, including concatenation as one simple example, or other more complicated logical or mathematical manipulations may be used.

Following key generation at step 28, the key is used to encrypt and decrypt data that is stored to and retrieved from a data storage device at step 32. In the personal computer or laptop computer context, the series of steps leading to and including key generation may be performed during the boot operation prior to any accesses to encrypted data storage devices. In these embodiments, all data, programs, etc. stored on the data storage devices are encrypted with the same key, a key which may require some user input to generate as described above. The computer may be either factory configured or user configured to require or not require user input for key generation.

The addition of user input to key generation provides an enhancement to data security beyond that provided when only the identification code is used to derive an encryption key. This is because if the entire computer is lost or stolen, when the computer is turned on only the computer owner will know what code or password to input in order to generate the proper key at step 28 of FIG. 2. Thus, access to encrypted programs and data is effectively prevented even with the original computer the hands of an unauthorized user.

Figure 3:
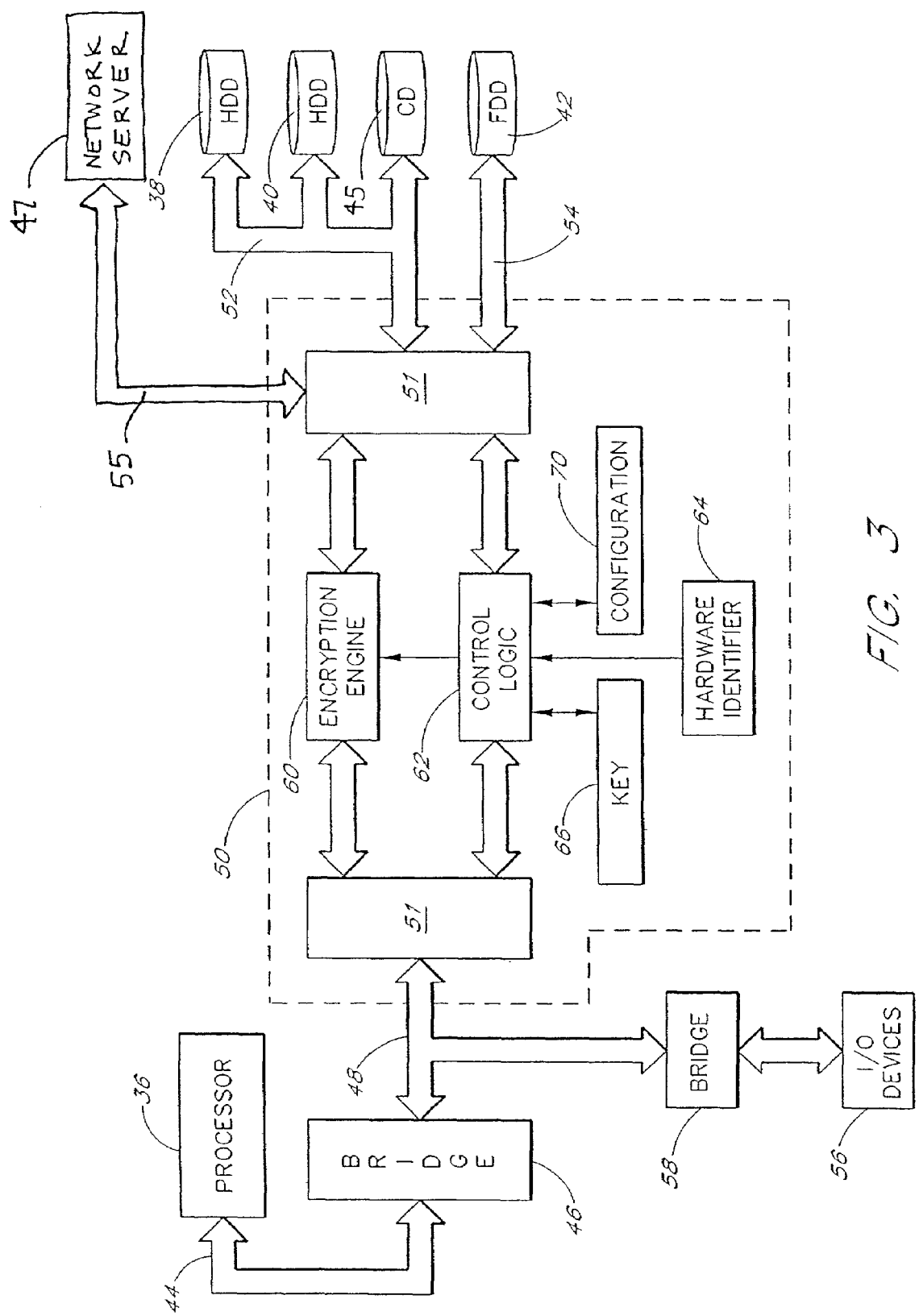
FIG. 3 is a block diagram illustrating an encrypting data path passing from a host processor to data storage devices, in accordance with one embodiment of the invention.

An embodiment of the invention is also illustrated in FIG. 3 which may be used to implement the process described above with reference to FIG. 2. In this Figure, a computer system is shown having a host processor 36, which may, for example, comprise a member of the Pentium® family of processors such as the Pentium, Pentium Pro, or Pentium II. Although industry standard PC architecture is used as an illustrative example in this Figure, it will be appreciated that many computer designs may be implemented using the principles illustrated herein. Also provided as part of the computer system of FIG. 3 are a plurality of data storage devices, including hard disk drives 38, 40, a floppy disk drive 42 and a CD drive 45, which may be of a writeable type. The computer system may also be coupled to a network server 47, and form a client node of a local or wide area network. In many typical embodiments, the computer system comprises a laptop or other form of personal computer.

The processor 36 interfaces with a host bus 44 which also interfaces with a bridge circuit 46. The bridge circuit 46 routes data from the host bus 44 to a PCI bus 48. The PCI bus 48 provides a data source to a logic circuit 50 which is provided in the data path between the PCI bus 48 and an IDE bus 52 and floppy drive control bus 54 which interface directly with the respective data storage devices 38, 40, 42, 44, and 46. The PCI bus 48 may also receive data from I/O devices 56 via a PCI to ISA bridge circuit 58.

The logic circuit 50 advantageously includes an encryption engine 60 which operates to encrypt data routed to one or more of the data storage devices 38, 40, 42, 46 or the network server 47 and to decrypt data routed from one or more of these sources when required. The logic circuit 50 will also generally include input and output bridge circuitry 51 to buffer data and convert the data transfer protocol from the PCI format bus 48 to the busses 52, 54, 55 which interface directly with the data storage devices 38, 40, 42, 46 and network server 47.

The encryption engine operates under the control of control logic 62. The control logic, in turn, receives information for controlling the encryption engine from three sources. The first is a memory location which stores a hardware identifier 64. As described above, this hardware identifier 64 may be substantially uniquely associated with the computer hardware. The memory may comprise a non-volatile writeable or read only memory to help ensure essentially permanent storage of the hardware identifier 64. As is also described above, the hardware identifier 64 stored in the memory may be used by the control logic 62 (or alternatively the processor 36) to at least in part derive a key for encryption and decryption of data to and from the data storage devices 38, 40, 42, 46. The control logic may also accept user input as described above to be used as additional information for key derivation.

This generated key may be stored in a key register 66 which also is coupled to the control logic 62. Prior to data being stored or retrieved from the data storage devices 38, 40, 42, 46, the key may be retrieved from the key register 66 for use by the encryption engine 60 during the encryption and decryption processes.

A configuration register 70 may also be coupled to the control logic 62. The content of the configuration register 70 may advantageously be user defined, and may include bits that determine which of the data storage devices 38, 40, 42, 46 have data encrypted before storage to the media, and which have data decrypted when data is retrieved from the media. This feature provides significant flexibility to the user. A user may, for example, want to encrypt some, but not all, data stored onto a floppy disk with the floppy drive 42. It may also be advantageous to have at least one hard drive 38 or 40, which contains DOS, Windows (™), Unix (™) or other operating system software, to remain unencrypted.

The configuration register may also contain bits which determine whether or not user input should be incorporated into the key being used to perform the encryption and decryption. In some embodiments, a different key may be stored for different drives. In this case, some of the keys may be generated with user input, and some without.

One advantageous aspect of the encryption system described herein is that it may be created with relatively minor modifications to currently existing integrated circuits. PCI to ISA and PCI to IDE bridges are well known and understood, and are commercially available from, for example, Intel Corporation. In one embodiment, therefore, an encryption engine, control logic, a key register, and a configuration register may be incorporated into an existing bridge integrated circuit design to produce a portion of the logic circuit 50. Furthermore, individual EPROM, EEPROM and ROM memories which include pre-programmed identification codes are available commercially from Dallas Semiconductor of Dallas Tex. as part numbers DS2401 and DS2430 for example. These devices include a unique 48 bit serial number in a ROM storage location which may be utilized as the memory location which stores the hardware identifier 64. These memory chips are available with a serial I/O interface for reading the identification code and any other stored data. In this embodiment, therefore, a bridge integrated circuit which includes the encryption logic may interface over a serial bus to a separate memory integrated circuit which stores the hardware identifier.

Figure 4:
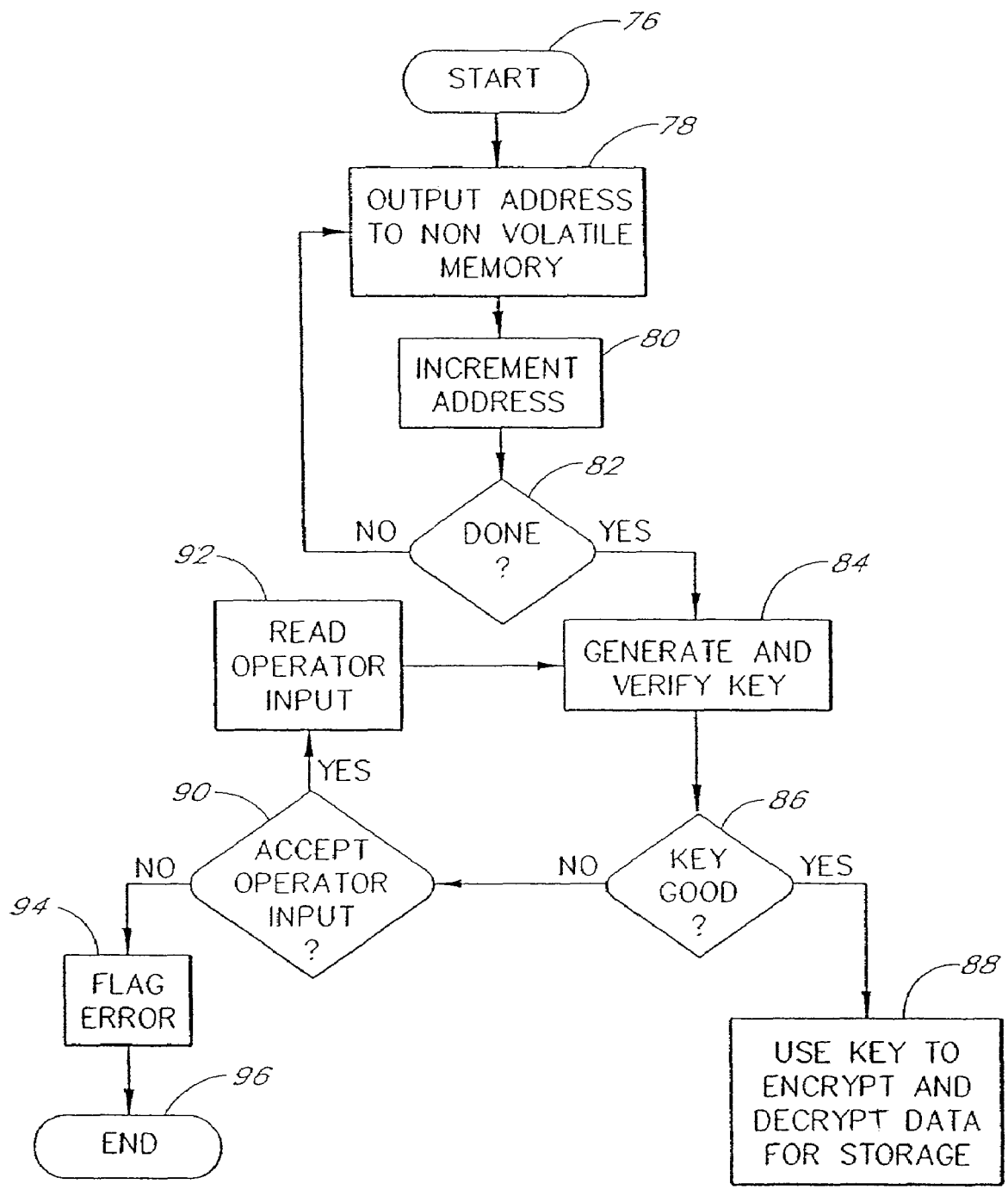
FIG. 4 is a flow chart illustrating acts performed during key generation in another embodiment of the invention.

FIG. 4 illustrates a method of key generation and verification which may be implemented with the system illustrated in FIG. 3. In the method of FIG. 4, the control logic 62 (FIG. 3) may be utilized to perform key generation and verification without intervention by the processor 36 (FIG. 3). The method begins at a start state 76. Following this start block 76, the system retrieves the hardware identifier 64 (FIG. 3) from the non-volatile memory location where it is stored. This retrieval process may involve the sequential retrieval of a set of data words from the memory as illustrated by the loop defined by blocks 78, 80, and 82. Thus, at block 78, the control logic 62 may output an initial address to the non-volatile memory to retrieve a first data word comprising a portion of the hardware identifier code 64. The address may then be incremented at block 80. If, at decision block 82, it is determined that the entire code has not yet been retrieved, the system loops back to block 78 and outputs the incremented address to the non-volatile memory to retrieve another segment of the code.

Once the entire code has been retrieved, at block 84 the control logic 62 may then generate and verify the key. As mentioned above, the process of key generation may involve merely storing a concatenation of the data words retrieved at steps 78-82 in the key register 66. This could occur during the retrieval process, or afterwards. Alternatively, mathematical or logical manipulations may be preformed on the retrieved data words prior to their storage into the key register. Key verification may also be performed in a number of ways known to those of skill in the art. For example, a checksum or CRC field may be provided in the configuration register 70 or control logic 62. If no user input is utilized in key generation, this field may be generated during an initialization sequence performed during the manufacture of either the logic circuit 50 or a computer system that the logic circuit 50 is incorporated into. If user input is utilized in key generation, this CRC or checksum field may be generated during a password initialization routine when the password to be utilized in key generation is initially entered by the user.

Following key generation and verification, the system moves to a decision state 86, where the result of the key verification of block 84 is checked. If the key is verified as good, the system moves to block 88, and the key is used to encrypt and decrypt data during data storage and retrieval operations. There are several reasons why key verification might fail. An error in reading the hardware identifier may cause faulty key generation. Tampering with the logic circuit 50 may also result in incorrect key generation. Additionally, key verification may fail because required operator input to be used in key generation has not yet been entered by a user. Thus, a failure of key verification may force user input. This is illustrated in FIG. 4 by the fact that if, at decision state 86, the key has not been verified as good, the system moves to another decision state 90. At decision state 90, the system determines whether or not user input should be accepted and used in the key generation process. If the system determines that operator input should be accepted, the system moves to block 92, where the input is read. The system then loops back to block 84, where the key is generated using both the operator input and the retrieved identification code, and is again verified against the stored CRC or checksum field. If the operator input was the correct password, the key will be verified as good at the next iteration of decision block 86, and at block 88, the key will be used to encrypt and decrypt data as described above.

If, however, the operator input was incorrect, the key verification process will fail, and the system will again move to decision state 90, where the system again determines whether or not user input should be accepted. It will be appreciated that the user may be given two or more attempts to successfully input the proper password. Thus, the system may loop back to blocks 92 and 84 a plurality of times, any one of which may result in correct password entry and normal data encryption and decryption at block 88.

After a selected number of iterations of incorrect password entry, the system may decide at state 90 to refuse to accept further operator input for key generation. In this event, the system moves to block 94 where the key error is flagged by the system. System response to the error flag may vary widely. The system may indicate to the user that the password entries are incorrect. The system may even be programmed to destroy the content of encrypted drives in the event the key verification process fails, or fails for a selected number of consecutive verification attempts.

The encryption system described thus provides data security to personal and laptop computer users in a transparent manner without requiring time consuming and expensive system administration or complex and expensive hardware. The system is especially adapted to individual users, and the high volume production of computers for these users. In addition, the system can be advantageously utilized to form an easily administrated secure computer networking system.

In the network environment, files which are stored to network drives associated with a network server (FIG. 3) may be encrypted by the local system prior to file transfer in a manner analogous to that set forth above when storing data files to local data storage devices. In this way, a given user's personal or confidential data may be protected when resident on a network accessible storage resource. In the network embodiment, public key cryptography is advantageously used because public encryption keys can be made available to the network servers and/or clients such that appropriate encryption processes can be performed transparently and without user intervention by different elements of the network.

Figure 5:
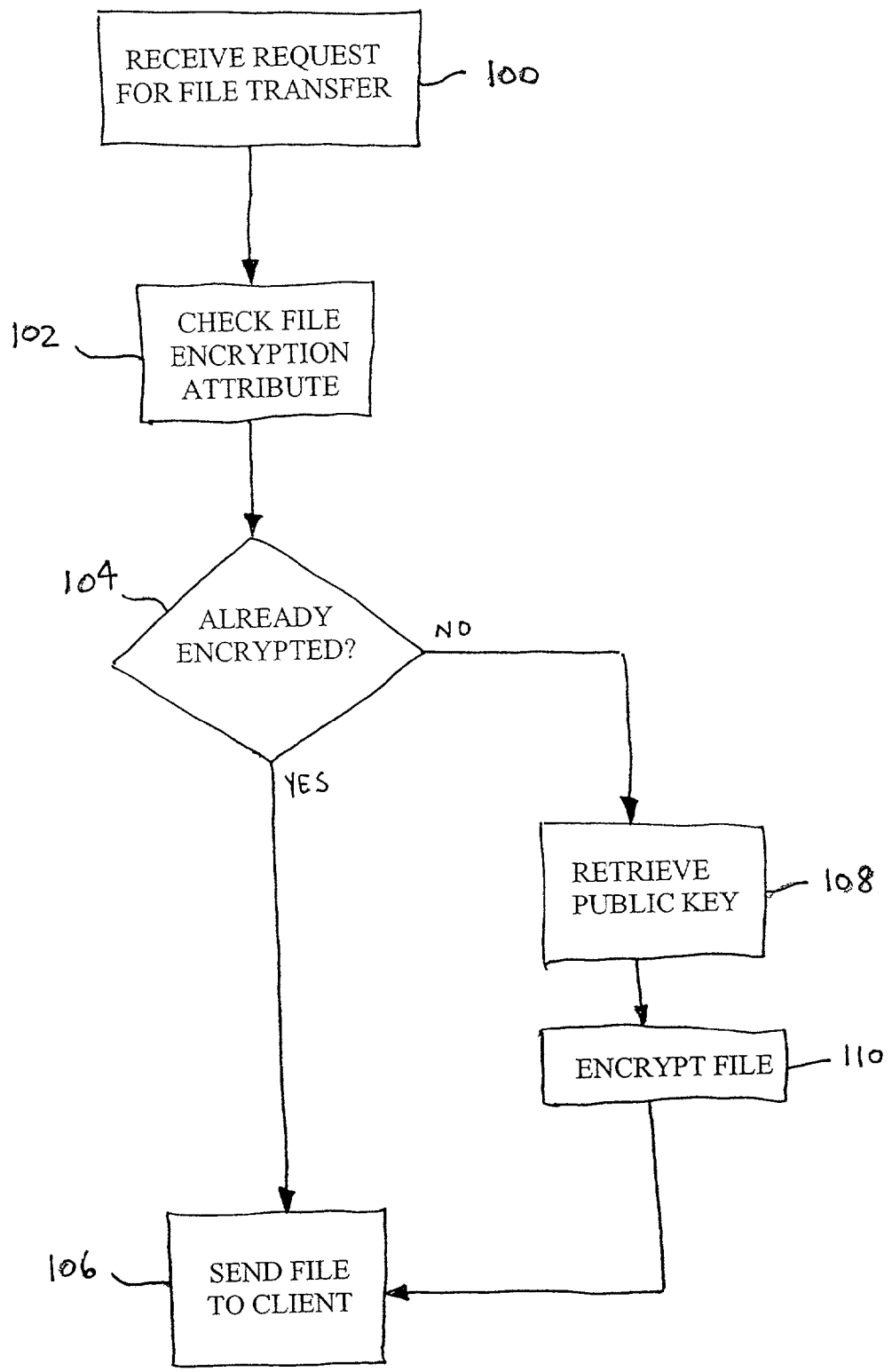
FIG. 5 is a flow chart of a process of encrypted file transfer in a network environment in accordance with one embodiment of the invention.

One example of a method of file transfer in a network embodiment of the invention is illustrated by the flow chart of FIG. 5. It can be appreciated that in a network environment, files may be stored at various dispersed locations. If the transparent encryption during save operations is employed as described above, different files on the same storage device may be encrypted with different keys depending on which client system performed the save operation. In addition, network accessible drives may include unencrypted files as well. Of course, any of these files may be retrieved by a client and stored on their own local drive.

Referring now to FIG. 5, in one embodiment of the invention, at block 100 a request for a file is forward from a client to a network server. At block 102, the network server checks the status of an encryption attribute associated with the file. This attribute is set or cleared depending on whether or not the file is already encrypted on the network server or is unencrypted. If the file was previously stored by the requesting client, the file may already be encrypted with the client's public key. In this case, the attribute would indicate that the file is encrypted, and may in some embodiments additionally indicate the owner of the public key that it was encrypted with. If at decision state 104 it is determined that the attribute indicates the file is already encrypted, then the server sends the file to the client at block 106. Once there, the file is decrypted using the private key stored by the requester, and is then viewed and/or stored locally.

It is possible that the requested file has been stored on the network server encrypted with a different user's public key. If this information is provided by the file attribute, the system may forward the requesting client a message indicating this fact. If the file is still sent to the requester, it will of course be unreadable by them because they will not have access to the private key of the user that originally encrypted and stored the file.

If alternatively it is determined at decision state 104 that the file is not encrypted, at block 108 the server retrieves the public key of the requestor. This may be done directly by retrieving the key from the memory location 66 (FIG. 3) where the public and private keys are stored on the requestor's system. It is also possible that the server could have a public key table stored locally from which the appropriate public key is available. Once the requestor's public key is retrieved by the server, at block 110 it uses the key to encrypt the file, and then sends the file to the requesting client where as described above it is decrypted for viewing and/or local storage. Preferably, all of the attribute checking and key retrieval is performed tranparently without any user intervention.

The invention thus has advantageous applicability to both stand alone computers and network systems. Files are stored either locally or on a network securely without effort on the part of the computer user. In addition, in the network embodiment, management of the cryptographic system and circuitry in each client computer can be controlled by a central administrator. In this embodiment, the configuration information stored in the memory 70 (FIG. 3) of each client may be accessible and alterable by a network administrator. Which files are encrypted and when could be centrally controlled however the administrator desired. If desired, key generation and distribution could also be controlled by the administrator.

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A method of transferring data over a computer network from a network server to a first client computer system, the method comprising:
   receiving a request by a requestor using a first client computer system for data from at least one network server storing data, at least some of the data stored by the network server being encrypted;
   verifying whether a public encryption key associated with the requestor is good;
   if verification fails, requesting user input from the requestor and generating a public encryption key and a private encryption key based at least in part on the user input and based at least in part on an identification code associated with the first client computer system;
   checking an attribute of the requested data stored on the network server to determine whether the requested data stored on the network server is encrypted with the public encryption key associated with the requestor;
   if the attribute stored on the network server indicates that the requested data stored on the network server is encrypted with the public encryption key associated with the requestor, automatically sending the encrypted data to the first client computer system;
   if the attribute stored on the network server indicates that the requested data is encrypted with a public encryption key that is different than the public encryption key associated with the requestor, automatically sending a message to the requestor indicating that the requested data is not encrypted with the public encryption key of the requestor;
   if the attribute stored on the network server indicates that the requested data is unencrypted, encrypting the requested data stored on the server with the public encryption key associated with the requestor automatically and without user intervention to create encrypted data; and
   sending the encrypted data to the first client computer system wherein the first client computer system automatically uses the private encryption key to decrypt the encrypted data without user intervention and sending the requested data to the first client computer system only if the requested data is encrypted and if the requestor is the owner of the encryption key.

2. The method of claim 1, wherein identification code is uniquely associated with hardware in the first client computer system.

3. The method of claim 2, wherein the encryption key is derived at least in part from user input.

4. A method of data storage and retrieval comprising:
   verifying whether a public encryption key associated with the requestor is good;
   if verification fails, requesting user input and automatically generating independently of information from a network server, a public encryption key and a corresponding private encryption key in a first client computer system based at least in part on the user input and based at least in part on an identification code associated with the first client computer system, wherein the network server stores at least some data in an encrypted format;
   storing the public encryption key and the corresponding private encryption key in the first client computer system such that access to the private encryption key is limited solely to the first client computer system and wherein both the public and the private encryption keys are needed to decrypt encrypted data;
   associating an attribute with a data file on the network server, the attribute indicating whether the data file is encrypted with the public encryption key associated with different requestors when stored on the network server, and the attribute indicating an owner of the public encryption key;
   requesting the data file by a requestor from the network server using the first client computer system;
   checking the attribute of the requested data file to determine whether the requested data file is encrypted with the public key of the requestor;
   if the attribute stored on the network server indicates that the requested data is encrypted with a public encryption key that is not associated with the requestor, sending a message to the requestor indicating that the requested data is not encrypted with their key;
   if the attribute stored on the network server indicates that the requested data file is encrypted with the public key associated with the requestor, forwarding the requested data file to the first client computer system; and
   if the attribute stored on the network server indicates that the requested data file is unencrypted, sending the public encryption key from the first client computer system to the network server automatically and without user intervention;
   forwarding the requested data file to the first client computer system after the public encryption key associated with the requestor is used to encrypt the requested data file to create an encrypted data file wherein the encrypted data file is forwarded to the requestor and sending the requested data file to the first client computer system if the requested data file is encrypted and the requestor is the owner of the public encryption key; and
   automatically decrypting without user intervention storing the encrypted data file with the private encryption key on a storage medium in the first client computer system.

5. The method of claim 4, wherein at least one of the public encryption key and the corresponding private encryption key are based on a password entered by a user when logging on to the first client computer system.

6. The method of claim 4, wherein the identification code is uniquely associated with hardware in the first client computer system.

7. A computer readable data storage medium having stored thereon commands that are operative to cause a general purpose computer configured as a network server to perform a method of data retrieval comprising:
- verifying whether an encryption key associated with a requestor is good;
- if verification fails, requesting user input from the requestor and generating an encryption key based at least in part on the user input and based at least in part on an identification code associated with the first client computer system;
- receiving a request for a data file from a requestor using a first client computer system at a network server, wherein at least some data files are encrypted;
- checking a file attribute of the requested data file stored on the network server to determine whether the requested data file is encrypted with the encryption key associated with the requestor, wherein the attribute is alterable by a network administrator;
- if the file attribute stored on the network server indicates that the requested data file is encrypted with the encryption key associated with the requestor, routing the encrypted data file to the first client computer system if the requested data file is encrypted and the requestor is the owner of the encryption key;
- if the file attribute stored on the network server indicates that the requested data file is encrypted with an encryption key that is different than the encryption key associated with the requestor, sending a message to the requestor indicating that the requested data is not encrypted with the encryption key associated with the requestor and;
- if the file attribute stored on the network server indicates that the requested data file is unencrypted, automatically requesting the public encryption key associated with the requestor from the first client computer system;
- automatically encrypting the requested data file using the public encryption key associated with the requestor to create an encrypted data file; and
- routing the encrypted data file to the first client computer system if the requested data file is encrypted and the requestor is the owner of the encryption key; and
- automatically decrypting without user intervention the encrypted data file with the private encryption key associated with the requestor.

8. The computer readable data storage medium of claim 7, wherein the encryption key is based at least partially on data associated with the first client computer system.

9. The computer readable data storage medium of claim 8, wherein the data associated with the first client computer system is uniquely associated with the first client computer system.

10. The computer readable data storage medium of claim 8, wherein the encryption key is also based on user input provided to the first client computer system.

* * * * *

UNITED STATES PATENT AND TRADEMARK OFFICE
CERTIFICATE OF CORRECTION

PATENT NO. : 7,526,795 B2
APPLICATION NO. : 09/818699
DATED : April 28, 2009
INVENTOR(S) : Rollins Page 1 of 1

It is certified that error appears in the above-identified patent and that said Letters Patent is hereby corrected as shown below:

In column 10, line 11, in Claim 4, delete "the requestor" and insert -- a requestor --, therefor.

Signed and Sealed this

Seventh Day of July, 2009

JOHN DOLL
*Acting Director of the United States Patent and Trademark Office*